US009628556B2

(12) United States Patent
Thomas et al.

(10) Patent No.: US 9,628,556 B2
(45) Date of Patent: Apr. 18, 2017

(54) DECENTRALIZED REQUEST ROUTING

(71) Applicant: Amazon Technologies, Inc., Seattle, WA (US)

(72) Inventors: Christopher C. Thomas, Seattle, WA (US); Christopher Kommareddy, Lynwood, WA (US); Preetha Chatterjee, Seattle, WA (US); Nan Zhong, Bellevue, WA (US); Mitchell Sundt, Seattle, WA (US); Vivek Rai, Amsterdam (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/491,322

(22) Filed: Sep. 19, 2014

(65) Prior Publication Data

US 2015/0006630 A1 Jan. 1, 2015

Related U.S. Application Data

(63) Continuation of application No. 12/544,517, filed on Aug. 20, 2009, now Pat. No. 8,843,630.

(60) Provisional application No. 61/136,312, filed on Aug. 27, 2008.

(51) Int. Cl.
| | |
|---|---|
| *G06F 15/16* | (2006.01) |
| *G06F 15/173* | (2006.01) |
| *H04L 29/08* | (2006.01) |
| *H04L 29/06* | (2006.01) |
| *H04L 12/803* | (2013.01) |

(52) U.S. Cl.
CPC ...... *H04L 67/1008* (2013.01); *H04L 67/1025* (2013.01); *H04L 67/42* (2013.01); *H04L 47/125* (2013.01)

(58) Field of Classification Search
CPC .................................. H04L 67/1002–67/1036
See application file for complete search history.

(56) References Cited

U.S. PATENT DOCUMENTS

| | | | | |
|---|---|---|---|---|
| 6,175,869 | B1 * | 1/2001 | Ahuja et al. | 709/226 |
| 6,327,622 | B1 * | 12/2001 | Jindal et al. | 709/228 |
| 6,360,256 | B1 * | 3/2002 | Lim | 709/223 |
| 6,513,061 | B1 * | 1/2003 | Ebata | H04L 29/06 709/201 |
| 6,795,858 | B1 * | 9/2004 | Jain et al. | 709/226 |
| 6,799,219 | B1 | 9/2004 | Sugahara et al. | |
| 7,650,376 | B1 * | 1/2010 | Blumenau | 709/203 |

(Continued)

OTHER PUBLICATIONS

Baker, Scott M., and Bongki Moon. "Distributed cooperative Web servers." Computer Networks 31.11 (1999): 1215-1229.

*Primary Examiner* — Emmanuel L Moise
*Assistant Examiner* — Julian Chang
(74) *Attorney, Agent, or Firm* — Thomas | Horstemeyer, LLP (57) ABSTRACT

Systems and methods provide logic for decentralized request routing. In one implementation, a computer-implemented method routes a request. The method includes receiving, by a client server, the request. The client server evaluates feedback information received by the client server from at least one of a plurality of host servers. The client server selects one of the plurality of host servers to process the request, based on the evaluation, and transmits the request to the selected one of the plurality of host servers.

20 Claims, 5 Drawing Sheets

(56) References Cited

U.S. PATENT DOCUMENTS

| | | | |
|---|---|---|---|
| 7,886,023 B1* | 2/2011 | Johnson | 709/219 |
| 7,930,427 B2* | 4/2011 | Josefsberg | H04L 67/1002 709/226 |
| 8,065,559 B2* | 11/2011 | Kamath | G06F 9/505 714/10 |
| 8,156,217 B2 | 4/2012 | Ramamoorthy | |
| 2001/0044851 A1* | 11/2001 | Rothman et al. | 709/231 |
| 2002/0059170 A1* | 5/2002 | Vange | 707/1 |
| 2002/0188740 A1* | 12/2002 | Tang et al. | 709/230 |
| 2002/0188753 A1* | 12/2002 | Tang et al. | 709/237 |
| 2003/0172145 A1 | 9/2003 | Nguyen | |
| 2004/0054690 A1 | 3/2004 | Hillerbrand et al. | |
| 2004/0230666 A1 | 11/2004 | Taboada et al. | |
| 2005/0015471 A1* | 1/2005 | Zhang et al. | 709/221 |
| 2005/0027862 A1* | 2/2005 | Nguyen et al. | 709/225 |
| 2005/0049972 A1 | 3/2005 | Hsu et al. | |
| 2005/0091378 A1* | 4/2005 | Nonnenmacher | 709/227 |
| 2006/0129665 A1 | 6/2006 | Toebes et al. | |
| 2006/0168334 A1* | 7/2006 | Potti et al. | 709/239 |
| 2006/0190580 A1 | 8/2006 | Shu et al. | |
| 2006/0224725 A1 | 10/2006 | Bali et al. | |
| 2006/0236324 A1 | 10/2006 | Gissel et al. | |
| 2006/0242320 A1 | 10/2006 | Nettle et al. | |
| 2006/0274761 A1* | 12/2006 | Error et al. | 370/396 |
| 2006/0281451 A1* | 12/2006 | Zur | 455/422.1 |
| 2007/0118667 A1* | 5/2007 | McCarthy et al. | 709/238 |
| 2007/0185996 A1 | 8/2007 | Bivens et al. | |
| 2007/0208874 A1* | 9/2007 | Previdi et al. | 709/238 |
| 2007/0226262 A1 | 9/2007 | Akkiraju et al. | |
| 2007/0250611 A1* | 10/2007 | Bhogal et al. | 709/223 |
| 2007/0288524 A1* | 12/2007 | Luick | 707/200 |
| 2008/0034072 A1* | 2/2008 | He | H04L 41/5009 709/223 |
| 2008/0091807 A1 | 4/2008 | Strub et al. | |
| 2008/0154796 A1 | 6/2008 | Pallister et al. | |
| 2008/0240144 A1* | 10/2008 | Kruse et al. | 370/449 |
| 2008/0263206 A1 | 10/2008 | Bivens et al. | |
| 2009/0006531 A1* | 1/2009 | Gillum | H04L 67/322 709/203 |
| 2009/0006541 A1* | 1/2009 | Baba et al. | 709/203 |
| 2009/0125332 A1 | 5/2009 | Martin | |
| 2009/0182839 A1 | 7/2009 | Nakamura | |
| 2009/0204612 A1 | 8/2009 | Keshavarz-Nia et al. | |
| 2009/0300161 A1 | 12/2009 | Pruitt et al. | |
| 2010/0023621 A1 | 1/2010 | Ezolt et al. | |
| 2010/0100525 A1 | 4/2010 | Huang | |
| 2010/0106820 A1* | 4/2010 | Gulati et al. | 709/224 |
| 2010/0179913 A1 | 7/2010 | Royer et al. | |
| 2010/0268764 A1* | 10/2010 | Wee et al. | 709/203 |
| 2010/0280932 A1 | 11/2010 | Jensen et al. | |
| 2011/0264792 A1* | 10/2011 | Sivakumar | H04L 67/104 709/224 |
| 2014/0082212 A1* | 3/2014 | Garg et al. | 709/233 |
| 2014/0280925 A1* | 9/2014 | Wee et al. | 709/224 |

* cited by examiner

DECENTRALIZED REQUEST ROUTING

CROSS-REFERENCE TO RELATED APPLICATIONS

This application is a continuation of U.S. utility application entitled "Decentralized Request Routing," having Ser. No. 12/544,517, filed Aug. 20, 2009, which claims the benefit of priority from U.S. Provisional Application No. 61/136,312, entitled "Decentralized Request Routing," filed Aug. 27, 2008, the disclosures of which are expressly incorporated herein by reference in their entireties.

BACKGROUND

A service-oriented architecture (SOA) provides resources for performing particular functions as independent services that are accessible in a standardized way over a network. The services are considered standardized because distributed program components can invoke the services without any knowledge of an underlying platform that supports the services. Communication and coordination of services with one another allows the services to perform activities for entities that are tenants of the SOA.

When an application exposes a service to a client computer, a host server performs the service for the client computer. In a typical SOA, each host server in a server fleet exposes its Internet protocol (IP) address to the client computer through a domain name system (DNS) record. Using the DNS record, the client computer selects one of the host servers in the server fleet. For example, the client computer may select one of the available host servers by making a random selection or by using a round robin technique.

Having the client select one of the host servers in the fleet presents several disadvantages. First, the client might transmit a request to a host server that is already processing a large quantity of requests and, as a result, the host server may experience processing delays or even fail due to receiving a large amount of traffic at one time. Second, to enable the client to select the host server, it is necessary to manage a DNS record that identifies available host servers and populate the DNS record with correct network addresses of the host servers. Third, it is necessary to monitor the host servers and update the network addresses that are stored in the DNS record when a host server fails. These maintenance and monitoring tasks consume resources and time.

To mitigate some of the problems outlined above, hardware load balancers may be used on the client side to balance requests across the host servers. Hardware load balancers distribute work between two or more computers or other resources to optimize resource use, throughput, or response time. Although using hardware load balancers on the client side may balance requests across host servers, hardware load balancers present other drawbacks. For example, a hardware load balancer represents a single point of potential failure for all of the clients that use it to route requests. To address this problem, in addition to an active hardware load balancer, it may be necessary to have one or more backup hardware load balancers. Furthermore, a hardware load balancer is a concentration point for network traffic and the hardware load balancer might reach its maximum capacity. For example, the bandwidth of a single hardware load balancer is approximately 80,000 requests per second. It may be necessary to have a fleet of hardware load balancers to handle requests, which is both costly and requires time consuming maintenance.

As is evident from the above, having a client select a host server using typical selection techniques does not provide any form of load balancing across a server fleet and, accordingly, clients may burden the same host server with many requests. Furthermore, hardware load balancers are disadvantageous due to cost, capacity limitations, and maintenance requirements. Therefore, there is a need for improved systems and methods that overcome the problems outlined above.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

The following detailed description refers to the accompanying drawings. Wherever possible, the same reference numbers are used in the drawings and the following description to refer to the same or similar parts. While several exemplary embodiments are described herein, modifications, adaptations and other implementations are possible. For example, substitutions, additions or modifications may be made to the components illustrated in the drawings, and the exemplary methods described herein may be modified by substituting, reordering, removing, or adding steps to the disclosed methods. Accordingly, the following detailed description is not limiting of the disclosed embodiments. Instead, the proper scope is defined by the appended claims.

Disclosed embodiments provide computer-implemented systems and methods for decentralized request routing. In disclosed embodiments, logic providing decentralized request routing may be added to client and/or host servers in lieu of the use of hardware load balancers. The disclosed logic for routing requests is considered decentralized, as compared to centralized routing mechanisms, such as hardware load balancers. For example, a client server may use the logic to dynamically select a host server to process a request (e.g., a request for a service) and/or a host server may use the logic to determine whether to process the request. Furthermore, client servers may communicate with a registry server to obtain information regarding available host servers and host servers may communicate with the registry server to be included as part of a server fleet.

In one embodiment, a client server may receive data regarding a set of servers (e.g., a membership set) that are available to handle a request (e.g., servers that support a particular service) from a registry server. The client server may receive updates from the registry server upon request or at periodic intervals (e.g., every minute, hour, etc.). Similarly, other client servers may receive data from the registry server. The registry server may include a data store storing addresses of host servers (e.g., a host server fleet) that can handle certain services or requests. For example, each host server may register its address with a discovery service provided by the registry server.

Client servers may select host servers to fulfill requests based on a selection technique, such as a routing algorithm. For example, the first time a client server transmits a request, the client server may randomly select a host server from a membership set. Subsequently, the client server may use feedback information to select a host server from the membership set. Feedback information may include the number of outstanding requests for a particular host server waiting in a queue and/or a current load of a particular host server. For example, when a host server responds to a client server, the host server may transmit feedback information, such as a current load of the host server. Furthermore, the client server may calculate and assign weights to one or more host servers in a server fleet. Accordingly, when making a subsequent request, the client server may select a host server based on the feedback information and/or the weights.

Consistent with a disclosed embodiment, a computer-implemented method routes a request from a client server to a host server. The method includes receiving, by the client server, data identifying a plurality of host servers available to process one or more types of requests. The client server further receives feedback information comprising data reflecting a load of at least one of the plurality of host servers. The client server receives the request, evaluates the feedback information, and selects one of the plurality of host servers to process the request, based on the evaluation of the feedback information. The client server transmits the request to the selected one of the plurality of host servers.

Consistent with another disclosed embodiment, a computer-implemented method routes a request. The method includes receiving, by a client server, the request. The client server evaluates feedback information received by the client server from at least one of a plurality of host servers and selects one of the plurality of host servers to process the request, based on the evaluation. The client server further transmits the request to the selected one of the plurality of host servers.

Consistent with yet another disclosed embodiment, a system is provided for request routing. The system comprises a registry server and a client server. The registry server comprises a data store. The data store includes data identifying a plurality of host servers that are available to process one or more types of requests. The client server comprises a processor and a memory. The client server is operable to receive a request, evaluate feedback information received by the client server from at least one of a plurality of host servers, select one of the plurality of host servers to process the request, based on the evaluation, and transmit the request to the selected one of the plurality of host servers.

Consistent with other disclosed embodiments, computer-readable media are provided that store program instructions, which when executed by a processor, perform any of the methods described herein.

Figure 1:
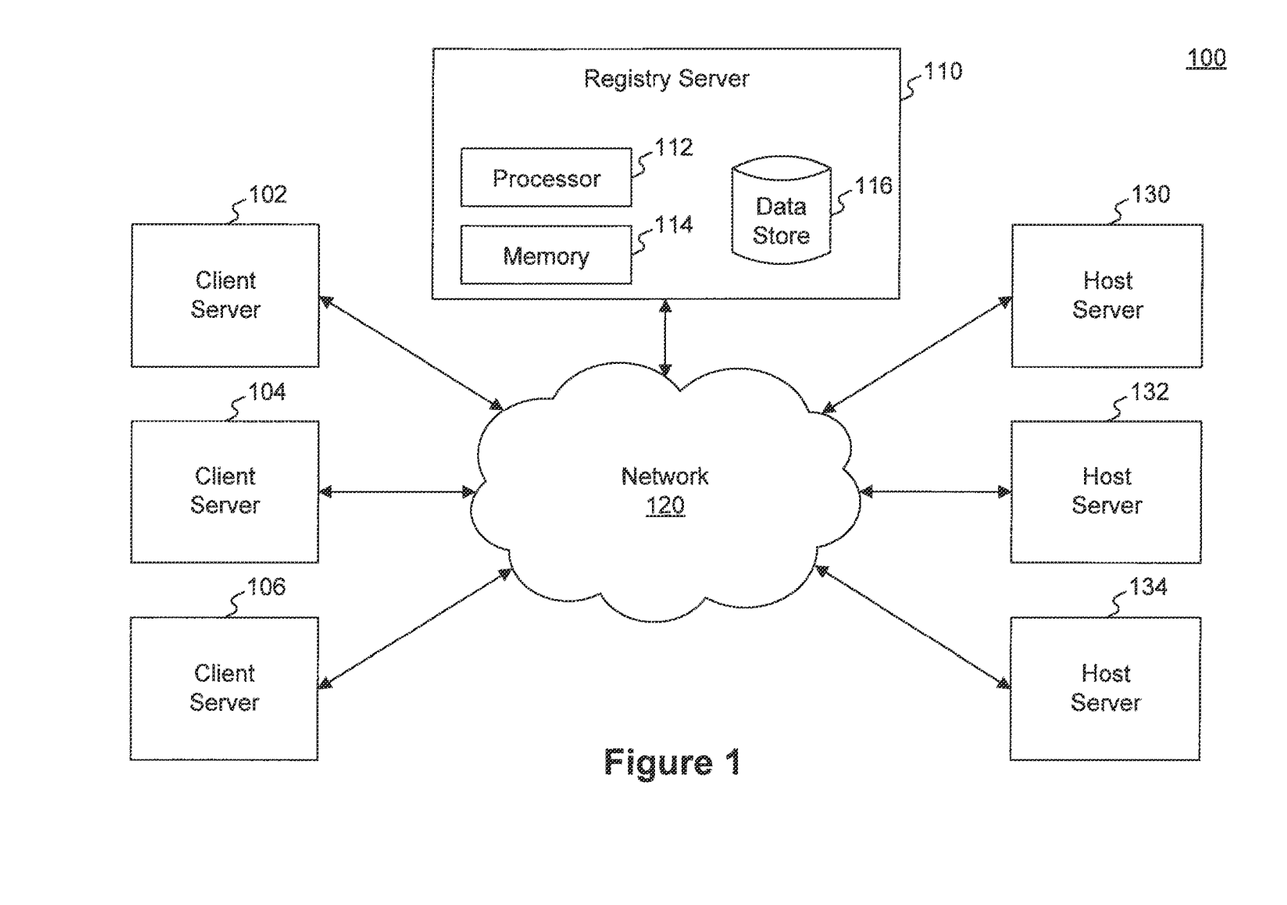
FIG. 1 is a diagram of an example of an architecture for a system that provides decentralized request routing.

FIG. 1 is a diagram of an example of an architecture for a system 100 that provides decentralized request routing, consistent with a disclosed embodiment. System 100 may provide functionality for routing a request from a client server to a host server. For example, an application on a client server may expose the client server to a service and the client server may select a host server to perform the service. As shown in system 100, client servers 102-106, registry server 110, and host servers 130-134 are connected to a network 120. One of skill in the art will appreciate that although three client servers, one registry server, and three host servers are depicted in FIG. 1, any number of these components may be provided. Furthermore, one of ordinary skill in the art will recognize that one or more components of system 100 may be combined and/or divided into sub-components.

Network 120 provides communications between the various components in system 100, such as client servers 102-106, registry server 110, and host servers 130-134. In addition, client servers 102-106, registry server 110, and host servers 130-134 may access legacy systems (not shown) via network 120, or may directly access legacy systems, data stores, or other network applications. Network 120 may be a shared, public, or private network, may encompass a wide area or local area, and may be implemented through any suitable combination of wired and/or wireless communication networks. Furthermore, network 120 may comprise an intranet or the Internet.

Client servers 102-106 may each comprise a general purpose computer (e.g., a personal computer, network computer, server, or mainframe computer) having one or more processors that may be selectively activated or reconfigured by a computer program. Client servers 102-106 may be implemented in a distributed network. For example, client servers 102-106 may communicate via network 120 with one or more additional servers (not shown), which may enable client servers 102-106 to distribute processes for parallel execution by a plurality of other servers. Additional details regarding client servers 102-106 are discussed below in connection with FIG. 2.

Registry server 110 may comprise a general purpose computer (e.g., a personal computer, network computer, server, or mainframe computer) having one or more processors that may be selectively activated or reconfigured by a computer program. Registry server 110 may comprise a processor 112, a memory 114, and a data store 116. Memory 114 may be one or more memory or storage devices that store data as well as software. Memory 114 may also comprise, for example, one or more of RAM, ROM, magnetic storage, or optical storage. Furthermore, memory 114 may store program modules that, when executed by processor 112, perform one or more processes for registering any of host servers 130-134 as part of a host server fleet and for providing data concerning members of the host server fleet to any of client servers 102-106.

Data store 116 may store data reflecting host servers that are members of a host server fleet. For example, data store 116 may store identifiers (e.g., addresses) of host servers (e.g., host servers 130-134) that are candidates, which are available for processing requests (e.g., service requests). Registry server 110 may access the identifiers and provide updates upon request or at periodic intervals (e.g., every minute, hour, etc.) to one or more of client servers 102-106. For example, data store 116 may store the identifiers in association with data indicating one or more services or requests that a particular host server is capable of handling. In one embodiment, a client server may receive data identifying a set of servers that are available to handle a request (e.g., servers that support a particular service) from registry server 110. In other embodiments, a client server may receive data identifying a set of servers that are generally available to handle requests of any type from registry server 110.

Host servers 130-134 may each comprise a general purpose computer (e.g., a personal computer, network computer, server, or mainframe computer) having one or more processors that may be selectively activated or reconfigured by a computer program. Host servers 130-134 may be implemented in a distributed network. For example, host servers 130-134 may communicate via network 120 with one or more additional servers (not shown), which may enable host servers 130-134 to distribute processes for parallel execution by a plurality of other servers. Additional details regarding host servers 130-134 are discussed below in connection with FIG. 3.

Host servers 130-134 may register their addresses with a discovery service provided by registry server 110. For example, any of host servers 130-134 may provide its address to the discovery service upon becoming available over network 120 and/or at a periodic time interval. Furthermore, data store 116 may update members of the host server fleet that are available to client servers (e.g., client servers 102-106). For example, data store 116 may regularly receive updates from host servers 130-134 and/or client servers 102-106 indicating which ones of host servers 130-134 are available to handle requests.

In one embodiment, one or more of client servers 102-106 may invoke a discovery service that requests data from registry server 110. For example, in response, client server 102 may receive data from registry server 110 reflecting a membership set of host servers (e.g., host servers 130-134) that are available to handle requests. The membership set may specify addresses of the host servers that are included in the membership set.

Client server 102 may periodically invoke the discovery service to obtain a membership set of host servers, replace members of the set, and/or add members to the set. For example, client server 102 may maintain a minimum number of host servers in its membership set. If the current number of host servers that are available in the membership set fall below the minimum number, client server 102 may request addresses of additional host servers from registry server 110 and/or may randomly select additional host servers to bring the membership set up to the desired level. Furthermore, client server 102 may drop host servers that are not performing up to a certain standard from its membership set. For example, host servers that have long wait times before processing requests may be removed from the membership set.

Client servers may select a host server (e.g., one of host servers 130-134) from the membership set using a selection technique, such as a routing algorithm. For example, client server 102 may use the routing algorithm to select one of host servers 130-134 that has receive a fewer number of requests from client server 102. The routing algorithm may consider other or alternative factors, such as the load being experienced by each of host servers 130-134 and/or the total number of outstanding requests at each of host servers 130-134.

In one embodiment, the routing algorithm used by client server 102 may use feedback information, which client server 102 may receive from one or more of host servers 130-134. For example, host server 130 may handle a request for client 102 and, when responding, may communicate the server load of host server 130. Information regarding the server load of host server 130 may be included in a response that is sent in reply to the request. Furthermore, the routing algorithm may dynamically adapt itself using the feedback information to remove host servers from the membership set when, for example, a host server becomes unavailable (e.g., a failure). Still further, the routing algorithm may assign weights to host servers (e.g., one or more of host servers 130-134) and use the weights to evaluate to which host server to route a request. Additional details regarding the routing algorithm and weights are discussed below.

Figure 2:
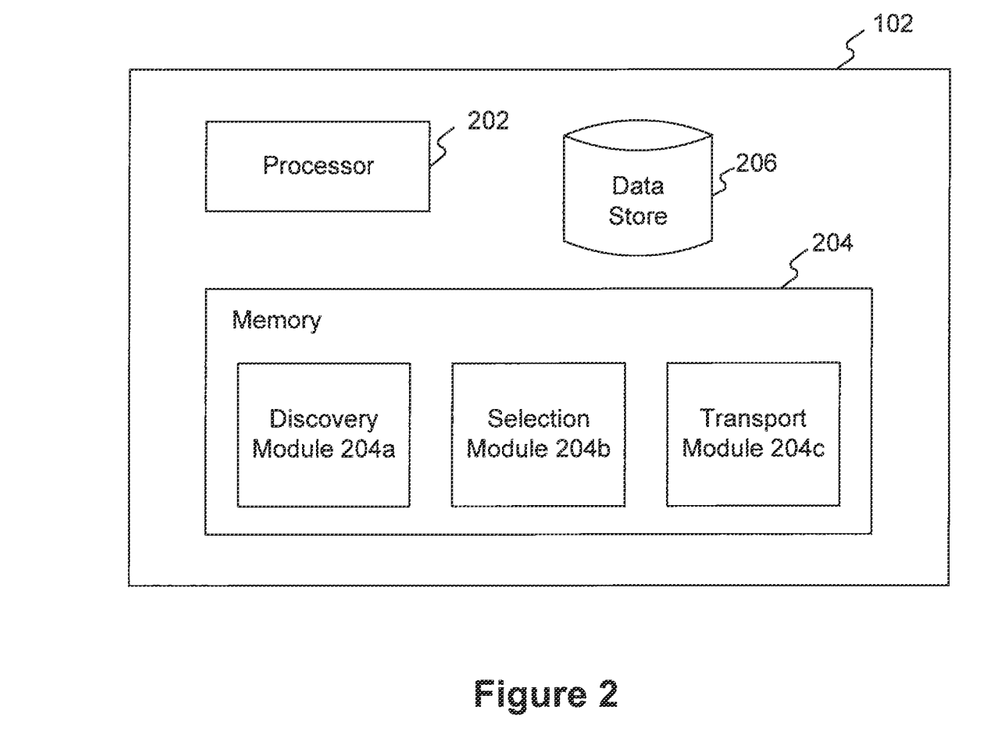
FIG. 2 is a diagram of an example of an architecture of a client server.

FIG. 2 shows a diagram of an example of an architecture of client server 102, consistent with a disclosed embodiment. Although the following discussion refers to client server 102, client servers 104 and 106 may include components equivalent to those discussed below in connection with FIG. 2.

Client server 102 may include a processor 202, a memory 204, and a data store 206. Memory 204 may be one or more memory or storage devices that store data as well as software. Memory 204 may comprise, for example, one or more of RAM, ROM, magnetic storage, or optical storage. Furthermore, memory 204 may store programming modules, which when executed by processor 202, perform one or more processes for discovering available host servers, selecting a host server, and transmitting a request to a selected host server. For example, memory 204 may include a discovery module 204*a*, a selection module 204*b*, and a transport module 203*c*, as shown in FIG. 2.

Discovery module 204*a* may discover host servers that are available to client server 102 to handle requests. For example, discovery module 240*a* may invoke a discovery service that requests data from registry server 110. In response, client server 102 may receive data from registry server 110 reflecting a membership set of host servers (e.g., host servers 130-134). The data reflecting the membership set may include identifiers (e.g., addresses) of host servers that are capable of handling requests. As discussed above, client server 102 may receive data identifying a set of servers that are available to handle a request (e.g., servers that support a particular service) from registry server 110 and/or client server 102 may receive data identifying a set of servers that are generally available to handle requests of any type.

Selection module 204*b* may select a host server (e.g., one of host servers 130-134) to handle a request in a variety of ways. For example, the first time that client server 102 transmits a request to a host server, client server 102 may randomly select a host server. Client server 102 may use feedback information to select servers for subsequent requests. For example, client server 102 may use feedback from the host servers and/or feedback information that client server 102 already has stored locally regarding the host servers in data store 206. Feedback information may constitute data reflecting a load of one of the host servers. A load of host server may comprise a total number of outstanding requests for one of the host servers, a number of outstanding requests of one of the client servers for one of the host servers, a utilization rate of a processor of one of the host servers, and/or a utilization rate of a memory of one of the host servers. For example, selection module 204*b* may access data store 206 of client server 102 to retrieve feedback information when selecting a host server.

Selection module 204*b* may select a host server (e.g., one of host servers 130-134) from the membership set using a selection technique, such as a routing algorithm. In one embodiment, the routing algorithm may use feedback information, which client server 102 may have previously received from one or more of host servers 130-134 and stored in data store 206. Furthermore, the routing algorithm may assign weights to host servers (e.g., one or more of host servers 130-134) and use the weights to evaluate to which host server to route a request. For example, client server 102 may store the weights in data store 206 in association with identifiers (e.g., addresses) of the host servers.

In one embodiment, selection module 204*b* may use weights for one or more of the host servers that are part of a membership set when selecting a host server. For example, in one embodiment, a weight for a host server may be calculated as follows:

$$Weight = \frac{(\text{prior weight of host server})(\text{average load of host servers in the membershipset})}{(\text{prior load of host server})}$$

The above expression may be evaluated by selection module 204b for one or more host servers in the membership set using available feedback information. In one embodiment, the higher a weight value for a host server, the lower the load of the host server. Accordingly, in one embodiment, selection module 204b may select a host server having a highest weight value. In other embodiments, selection module 240b may make a weighted random selection of a host server.

Transport module 204c may transmit a request to the host server selected by the selection module 204b. For example, transport module 204c may open a connection using a transport protocol (e.g., HTTP, HTTPs, etc.) with the selected host server (e.g., host server 130) and transmit the request.

Figure 3:
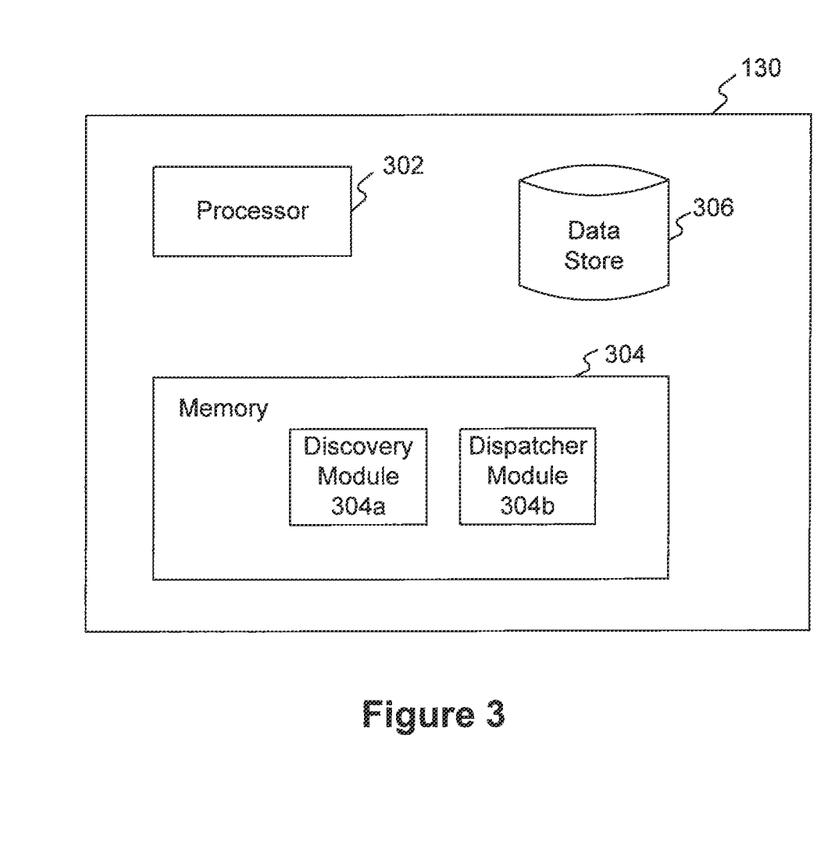
FIG. 3 is a diagram of an example of an architecture of a host server.

FIG. 3 shows a diagram of an example of an architecture of host server 130, consistent with a disclosed embodiment. Although the following discussion refers to host server 130, host servers 132 and 134 may include components equivalent to those that are discussed below in connection with FIG. 3.

Host server 130 may include a processor 302, a memory 304, and a data store 306. Memory 304 may be one or more memory or storage devices that store data as well as software. Memory 304 may comprise, for example, one or more of RAM, ROM, magnetic storage, or optical storage. Furthermore, memory 304 may store logic for a discovery agent module 304a and a dispatcher module 304b, which when executed by processor 302, perform one or more processes for registering host server 130 with registry server 110 and transmitting responses to the client servers. For example, memory 304 may include a discovery module 304a and a dispatcher module 304b.

In one embodiment, discovery module 304a may provide functionality consistent with the functionality discussed above in connection with discovery module 204a. Alternatively, or in addition, discovery agent module 304a may provide functionality for registering host server 130 with registry server 110. For example, host discovery module 304a may register the address of host server 130 with a discovery service provided by registry server 110. In response, host server 130 may receive data reflecting threshold limits of other host servers from registry server 110 and/or client servers 102-106. For example, host server 130 may store threshold data in data store 306.

Dispatcher module 304b may receive requests from client servers 102-106 and/or transmit responses to client servers 102-106. The responses that are sent by dispatcher module 304b may include feedback information, such as the load being experienced by host server 130. For example, the load being experienced by host server 130 may comprise a total number of outstanding requests for host server 130, a number of outstanding requests being handled by host server 130 for a specific one of client servers 102-106, a utilization rate of a processor of host server 130, and/or a utilization rate of a memory of host server 130.

Figure 4:
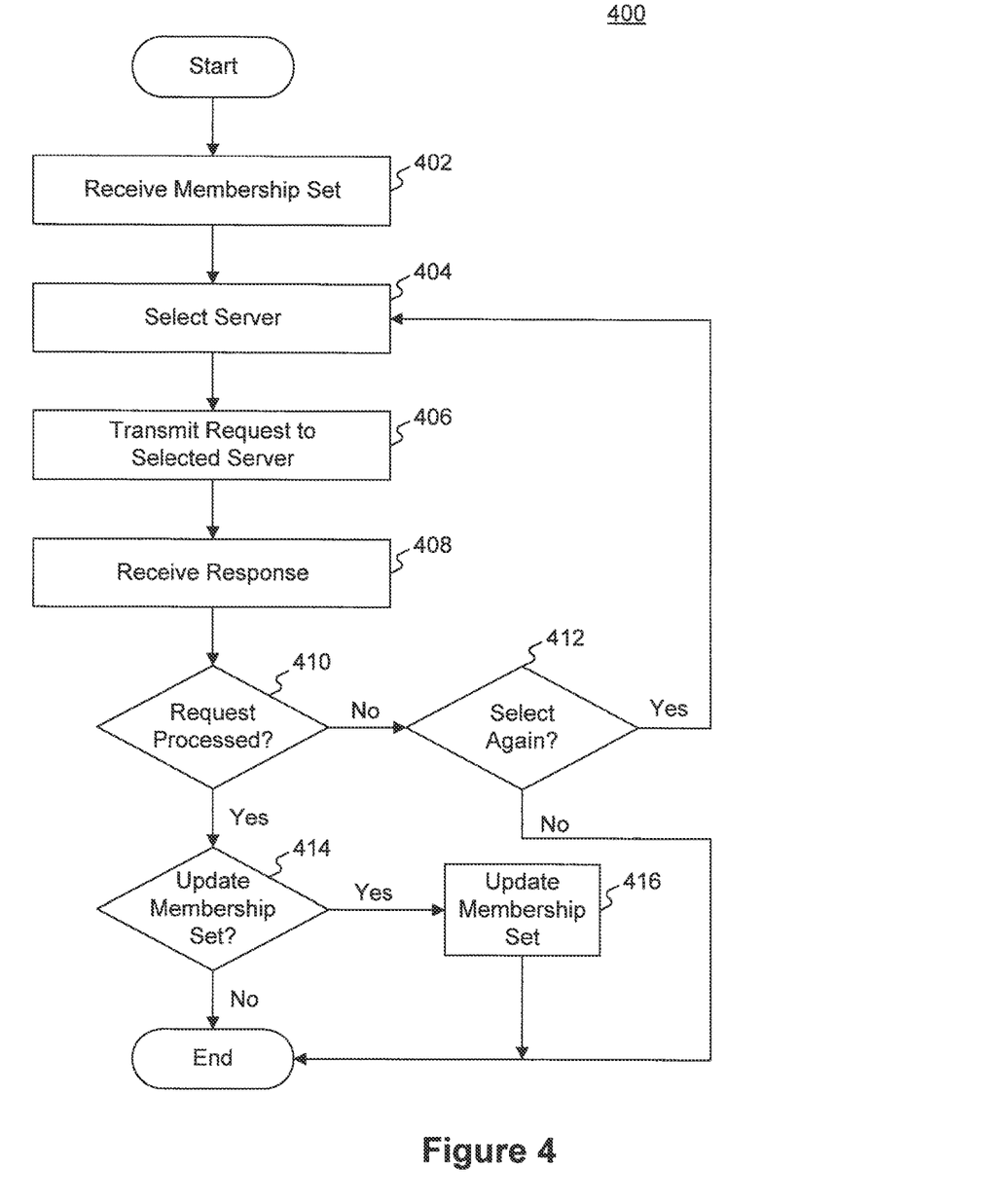
FIG. 4 is a flow diagram of an example of a routine for routing a request.

FIG. 4 is a flow diagram of an example of a routine 400 for routing a request, consistent with a disclosed embodiment. Routine 400 provides further details describing how system 100 may implement functionality to provide decentralized request routing. For example, in the following discussion, client server 102 may invoke a service (e.g., a service to process an order, process payment information, etc.).

In block 402, client server 102 may receive data identifying a membership set. For example, discovery module 204a may have requested data from a discovery service provided by registry server 110 and client server 102 may receive the data identifying the membership set from registry server 110 in response to the request. Discovery module 204a may transmit such a request to registry server 110 on a periodic basis (e.g., every minute, hour, day, etc.) or on an ad-hoc basis. The membership set may specify one or more of host servers 130-134 that are available to process requests from client server 102.

The servers that are identified to client server 102 in the membership set may have particular qualities and/or capabilities. For example, in one embodiment, client server 102 may request a membership set from registry server 110 that identifies servers that are capable of handling certain requests (e.g., performing certain services). Alternatively, in other embodiments, the membership set may reflect servers that are capable of handling various types of requests.

In block 404, selection module 204b of client server 102 may select one of the host servers that were identified in block 402 to handle a request. For example, the first time that client server 102 selects a server, the selection may be a random selection of a host server that is included in the membership set. Subsequent selections of host servers may be made using additional information, such as feedback information. Furthermore, selection module 204b may make a weighted selection of host servers based on weight values that have been assigned to the host servers by client server 102 or by making a weighted random selection. For example, as discussed above, selection module 204b may retrieve weights for one or more host servers in the membership set from data store 206 and then select a host server with a highest weight value (i.e., reflecting a lowest server load) or based on a weighted random selection.

In block 406, transport module 204c of client server 102 may transmit the request to the selected host server. For example, host servers 130 and 132 may have been identified by registry server 110 as available host servers for the membership set in block 402 and, in block 404, client server 102 may have selected host server 132 to perform the service. Accordingly, in block 406, client server 102 may transmit a request to host server 132 to perform the service. Host server 132 may perform the service and return a response.

In block 408, client server 102 may receive a response from the host server that was selected in block 406 (e.g., client server 102 may receive the response from host server 132). Furthermore, the response may include feedback information regarding the performance of host server 132. Client server 102 may store the feedback information in data store 206.

In block 410, client server 102 may determine whether the request was processed by examining the response that was received from the host server. For example, the received response may include a result of performing the requested service (e.g., confirmation that an order has been received). Alternatively, the response may include data indicating that the host server cannot process the request or will be delayed in processing the request. Furthermore, the received response may include feedback information regarding the host server, such as the number of outstanding requests for the host server and/or a current load of the host server. For example, client server 102 may store the feedback information in data store 206 and/or use the feedback information to recalculate a weight for the host server.

If client server 102 determines that the request was processed, routine 400 may proceed to block 414. If client server 102 determines that the request was not processed, routine 400 may proceed to block 412.

In block 412, client server 102 determine whether to select another host server to process the request. For example, the response from host server 132 may include an expected wait time and/or may indicate that host server 132 is overloaded. Client server 102 may use the feedback information to determine whether to select another host server or to wait for a response from the host server 132.

If client server 102 did not receive a response in block 408 from host server 132 and determines that another selection of a host server should be made, then routine 400 may return to block 404 to select another host server. Client server 102 may further update the membership set to remove host server 132 and/or may request a replacement host server from registry server 110. If client server 102 determines that another selection of a host server should not be made, then routine 400 may end.

In block 414, following receipt of a response indicating that the request was processed, client server 102 may determine whether to update the membership set. For example, the response may include feedback information regarding the number of outstanding requests and/or a current load of the host server. If client server 102 determines to update the membership set, then routine 400 may proceed to block 416. If client server 102 determines not to update the membership set, then routine 400 may end.

In block 416, client server 102 may update the membership set. For example, client server 102 may update the membership set based on feedback information that it received with the response in block 408.

As discussed above, client servers may receive information from registry server 110 on a periodic or ad-hoc basis. When a client server learns of the existence of a new host server, the client server may start to transmit requests to the new host server and receive feedback information. If the load of a new host server that is communicated back to a client server is equal to or an above average load of the host servers in the client server's membership set, then the client server may not add the new host server to the membership set. However, if the load of the new host server is less than an average load of the current members of the membership set, then the client server may add the new host server to the membership set. If when adding a new host server, the membership set has reached a maximum number (e.g., a predetermined maximum number of host servers), then the client server may remove from the membership set a host server that is underperforming (e.g., a worst performing host server) when the new host server is added.

In other embodiments, when adding a new host server, the client server may, in lieu of removing an underperforming host server, maintain the current membership set and add the new host server to the membership. If the new host server performs at an acceptable level, then the client server may subsequently remove from the membership set one or more host servers that are underperforming. However, if a new host server is not performing at an acceptable level, then the client server may remove it from the membership set.

Figure 5:
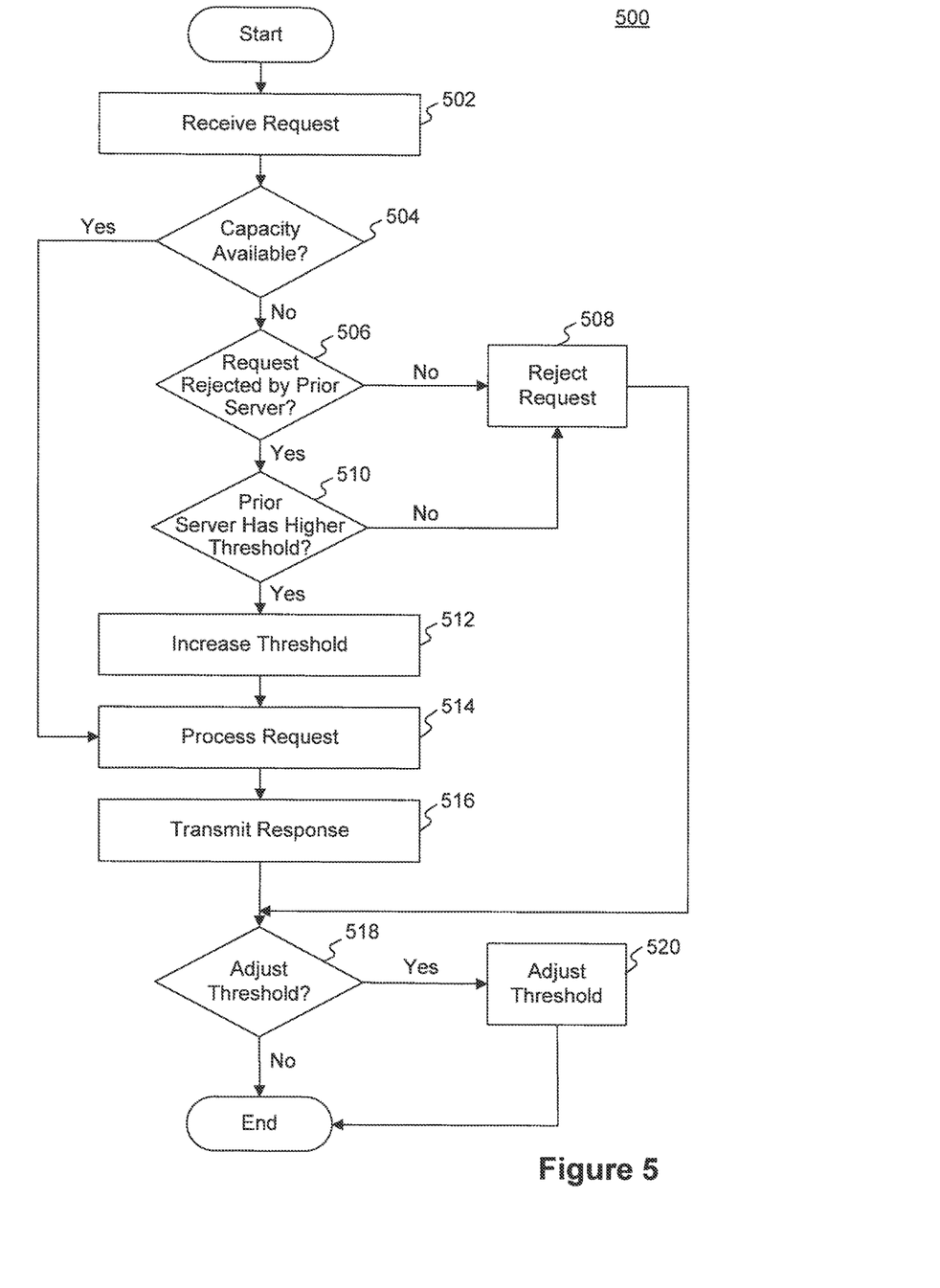
FIG. 5 is a flow diagram of an example of a routine for handling a request.

FIG. 5 is a flow diagram of an example of a routine 500 for handling a request, consistent with a disclosed embodiment. Routine 500 provides further details describing how system 100 may implement functionality to handle a request by, for example, host server 132.

In block 502, host server 132 may receive a request from client server 102. For example, client server 102 may have selected host server 132 using a routing algorithm, as discussed above.

In block 504, host server 132 may determine whether it has sufficient capacity to handle the request. For example, host server 132 may examine a queue depth of memory 304 to determine whether or not host server 132 has reached a predetermined threshold of pending requests. If host server 132 has available capacity to handle the request (e.g., the queue depth is below the threshold), then routine 500 may proceed to block 514. If host server 132 does not have capacity to handle the request (e.g., the queue depth has reached or exceeded the threshold), then routine 500 may proceed to block 506.

In block 506, host server 132 may determine whether the request received in block 502 was previously rejected by a prior server. For example, host server 132 may inspect data included with the request to determine whether or not the request was rejected by another server before being received by host server 132. If host server 132 determines that the request was previously rejected by a prior server, then routine 500 may proceed to block 510.

If host server 132 determines in block 506 that the request was not rejected by a prior server, then routine 500 may proceed to block 508. In block 508, host server 132 may reject the request and transmit a response indicating that host server 130 cannot process the request (e.g., because host server 130 has reached its threshold). Following block 508, the process may proceed to block 518.

In block 510, host server 132 may determine whether or not the prior server that rejected the request has a higher threshold than host server 132. Host server 132 may inspect data received from registry server 110 to determine the threshold of the prior server. Alternatively, the threshold of the prior server may be included with the request, which host server 132 received in block 502. If host server 132 determines that the prior server has a higher threshold, then routine 500 may proceed to block 512. If host server 132 determines that the prior server does not have a higher threshold, then routine 500 may proceed to block 508.

In block 512, host server 132 may increase its threshold. For example, host server 132 may increases its threshold to at least a threshold value that is equal to the prior server that rejected the request.

In block 514, host server 132 may process the request. For example, host server 132 may perform a service and generate a response.

In block 516, host server 132 may transmit a response. For example, the response may include a result of performing the service. Furthermore, the response may include feedback information regarding the performance of host server 132.

In block 518, host server 132 may determine whether or not to adjust its threshold. If host server 132 determines that it should adjust its threshold, then routine 500 may proceed to block 520. If host server 132 determines that it should not adjust its threshold, then routine 500 may end.

In block 520, host server 132 may adjust its threshold. For example, host server 132 may adjust its threshold by increasing or decreasing its threshold level. For example, after having increased its threshold, host server 132 may decrease its threshold at a constant rate over time until the threshold reaches a prior level (e.g., equivalent to a level prior to being raised).

As one of ordinary skill in the art will appreciate, one or more of blocks 402-416 and 502-520 may be optional and may be omitted from implementations in certain embodiments. Furthermore, functionality provided by one or more of blocks 402-416 and 502-520 may be subdivided into multiple blocks.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting additional blocks or deleting blocks. It is intended, therefore, that the specification and examples be considered as exemplary only, with a true scope and spirit being indicated by the following claims and their full scope of equivalents.

Therefore, the following is claimed:

1. A method for routing a service request from a client server to a host server, the method comprising:
receiving, by the client server from a registry server, data identifying a plurality of host servers of a service available to process one or more types of service requests;
providing, by the client server, data identifying a membership set having a number of the plurality of host servers in the membership set;
receiving, by the client server from one or more of the plurality of host servers, performance feedback information comprising data representing a current load of at least one of the plurality of host servers in the membership set upon responding to a previous service request;
identifying, by the client server, a first host server in the membership set that is not performing according to a performance level based in part on the received performance feedback information;
adding, by the client server, a second host server to the membership set, wherein the second host server is a potential replacement for the first host server within the membership set;
removing, by the client server, the first host server from the membership set at least based in part on the received performance feedback information indicating that the second host server is shown to perform above a standard level, wherein the second host server remains a member of the membership set thereby replacing the first host server; and
transmitting, by the client server, a new service request to one of the plurality of host servers in the membership set.

2. The method of claim 1, wherein the data identifying the plurality of host servers comprises a plurality of addresses of the plurality of host servers.

3. The method of claim 1, further comprising receiving, by the client server, a response from the one of the plurality of host servers in the membership set, the response comprising data representing an updated current load of the one of the plurality of host servers in the membership set.

4. A computer-implemented method for routing a service request, comprising:
receiving data identifying a plurality of host servers of a service available to process one or more types of service requests;
providing data identifying a membership set having a number of the plurality of host servers in the membership set;
receiving performance feedback information comprising data representing an operational status of at least one of the plurality of host servers in the membership set upon responding to a previous service request;
identifying a first host server in the membership set that is not performing according to a standard level based in part on the received performance feedback information;
adding a second host server to the membership set, wherein the second host server is a potential replacement for the first host server within the membership set;
removing the first host server from the membership set at least based in part on the received performance feedback information indicating that the second host server is shown to perform above the standard level, wherein the second host server remains a member of the membership set thereby replacing the first host server; and
transmitting a new service request to one of the plurality of host servers in the membership set.

5. The computer-implemented method of claim 4, further comprising removing a host server from the membership set that is no longer available.

6. The computer-implemented method of claim 4, wherein the standard level comprises a maximum average wait time for processing requests.

7. The computer-implemented method of claim 5, further comprising adding a new host server to the membership set to replace the removed host server that is no longer available.

8. The computer-implemented method of claim 4, wherein the operational status comprises a total number of outstanding requests for the one of the plurality of host servers.

9. The computer-implemented method of claim 4, wherein the operational status comprises a number of outstanding requests for the one of the plurality of host servers.

10. The computer-implemented method of claim 4, wherein the operational status comprises a processor utilization rate of the one of the plurality of host servers.

11. The computer-implemented method of claim 4, wherein the operational status comprises a memory utilization rate of the one of the host servers.

12. The computer-implemented method of claim 4, further comprising invoking a discovery service to discover one or more additional host servers not currently contained in the membership set and that are available to process requests of a client server.

13. The computer-implemented method of claim 12, wherein the discovery service accesses a data record of a registry server to discover the one or more additional host servers.

14. A system for request routing, comprising:
a registry server, the registry server comprising a data store, the data store including data identifying a plurality of host servers that are available to process one or more types of service requests;
a client server comprising a processor and a memory, the client server operable to:
receive, from the registry server, the data identifying the plurality of host servers that are available to process one or more types of service requests;
receive, from one or more of the plurality of host servers, performance feedback information comprising data representing an operational status of at least one of the plurality of host servers, wherein the performance feedback information is provided as part of a response to a previous service request;
identify a first host server in a membership set of the plurality of host servers that is not performing according to performance level based in part on the received performance feedback information;
add a second host server to the membership set, wherein the second host server is a potential replacement for the first host server within the membership set;
remove the first host server from the membership set at least based in part on the received performance feedback information indicating that the second host server is shown to perform above a standard level, wherein the second host server remains a member of the membership set thereby replacing the first host server; and
transmit a new service request to one of the plurality of host servers in the membership set.

15. The system of claim 14, wherein the one of the plurality of host servers in the membership set is configured to send new performance feedback information to the client server in responding to the new service request from the client server, wherein the new performance feedback information comprises data representing a load of the one of the plurality of host servers in the membership set.

16. The system of claim 14, wherein the operational status comprises a total number of outstanding requests for the at least one of the plurality of host servers.

17. The system of claim 14, wherein the operational status comprises a number of outstanding requests of the client server for the at least one of the plurality of host servers.

18. The system of claim 14, wherein the operational status comprises a processor utilization rate of the at least one of the plurality of host servers.

19. The system of claim 14, wherein the operational status comprises a memory utilization rate of the at least one of the plurality of host servers.

20. The system of claim 14, wherein the client server is further operable to receive a response from the one of the plurality of host servers, the response comprising data representing an updated current load of the one of the plurality of host servers, wherein the client server utilizes the updated current load to process a subsequent service request.

* * * * *